US012664611B2

(12) United States Patent
Ma et al.

(10) Patent No.: US 12,664,611 B2
(45) Date of Patent: Jun. 23, 2026

(54) INFERRING HIGH RESOLUTION IMAGERY

(71) Applicant: Deere & Company, Moline, IL (US)

(72) Inventors: Hongxu Ma, San Jose, CA (US); Yuchi Ma, Madison, WI (US); Hong Wu, Los Altos, CA (US)

(73) Assignee: Deere & Company, Moline, IL (US)

( * ) Notice: Subject to any disclaimer, the term of this patent is extended or adjusted under 35 U.S.C. 154(b) by 564 days.

(21) Appl. No.: 17/976,233

(22) Filed: Oct. 28, 2022

(65) Prior Publication Data

US 2024/0144424 A1 May 2, 2024

(51) Int. Cl.
| | |
|---|---|
| *G06T 3/4053* | (2024.01) |
| *G06V 10/44* | (2022.01) |
| *G06V 20/10* | (2022.01) |
| *G06V 20/13* | (2022.01) |

(52) U.S. Cl.
CPC ............ *G06T 3/4053* (2013.01); *G06V 10/44* (2022.01); *G06V 20/13* (2022.01); *G06V 20/188* (2022.01)

(58) Field of Classification Search
CPC ...... G06V 10/44; G06V 20/13; G06V 20/188; G06V 20/194; G06T 3/4053
See application file for complete search history.

(56) References Cited

U.S. PATENT DOCUMENTS

| | | | |
|---|---|---|---|
| 5,949,914 A | 9/1999 | Yuen | |
| 9,342,760 B1 | 5/2016 | Deskevich et al. | |
| 10,225,449 B2 * | 3/2019 | Zhang ................... | G01J 3/2823 |

| | | | |
|---|---|---|---|
| 2014/0267759 A1 | 9/2014 | Leonard | |
| 2019/0045168 A1 * | 2/2019 | Chaudhuri ............ | G06T 3/4053 |
| 2020/0125822 A1 * | 4/2020 | Yang ..................... | G06T 3/4007 |
| 2020/0126232 A1 * | 4/2020 | Guo ...................... | A01D 41/127 |
| 2022/0061236 A1 | 3/2022 | Guan et al. | |
| 2022/0156492 A1 * | 5/2022 | Basu ......................... | G06T 5/50 |
| 2023/0162496 A1 * | 5/2023 | Basu ................... | G06V 10/764 |
| | | | 382/173 |
| 2023/0386200 A1 * | 11/2023 | De Moura Estevao Filho ........... | |
| | | | G06V 10/60 |

(Continued)

FOREIGN PATENT DOCUMENTS

| | | | | |
|---|---|---|---|---|
| CN | 113191939 A | * | 7/2021 | .............. G06T 7/10 |

OTHER PUBLICATIONS

Dosovitskiy et al., "An Image is Worth 16×16 Words: Transformers for Image Recognition at Scale" arXiv:2010.11929v2 [cs.CV], 22 pages, dated Jun. 3, 2021.

(Continued)

*Primary Examiner* — John Villecco
*Assistant Examiner* — Kyla Guan-Ping Tiao Allen
(74) *Attorney, Agent, or Firm* — Fenwick & West LLP

(57) ABSTRACT

Implementations are described herein for using one or more transformer networks to generate inferred image data based on processing image data capturing a particular geographic area during a particular time period, including first image data captured in a first spectral band and at a first spatial (and/or temporal) resolution and second image data captured in a second spectral band and at a second spatial (and/or temporal) resolution. The inferred image data can include second spectral information at the first spatial (and/or temporal) resolution, or vice versa. Thus, the spatial and/or temporal resolution of image data of a certain spectral band can be improved, allowing for more effective usage of satellite imagery in agricultural settings.

20 Claims, 6 Drawing Sheets

(56)                    References Cited

U.S. PATENT DOCUMENTS

| 2024/0070845 A1* | 2/2024 | Scharf | G06V 20/13 |
| 2024/0135683 A1* | 4/2024 | Li | G06V 20/70 |

OTHER PUBLICATIONS

Muller et al., "Super-Resolution of Multispectral Satellite Images Using Convolutional Neural Networks" 8 pages.

Lim et al., "Enhanced Deep Residual Networks for Single Image Super-Resolution" arXiv:1707.02921v1 [cs.CV], 9 pages, dated Jul. 10, 2017.

Lanaras et al., "Super-resolution of Sentinel-2 images: Learning a globally applicable deep neural network" arXiv:1803.04271v2 [cs.CV] 19 pages, dated Oct. 1, 2018.

Massimiliano Gargiulo, "Advances on CNN-Based Super-Resolution of Sentinel-2 Images" arXiv:1902.02513v1 [ds.CV], 4 pages, dated Feb. 17, 2019.

Galar et al., "Super-Resolution of Sentinel-2 Images Using Convolutional Neural Networks and Real Ground Truth Data" Remote Sensing. 2020, 12, 2941; doi:10.3390/rs12182941, 37 pages, dated Sep. 10, 2020.

Vaswani et al., "Attention Is All You Need" arXiv:1706.03762v5 [cs.CL], 15 pages, dated Dec. 6, 2017.

* cited by examiner

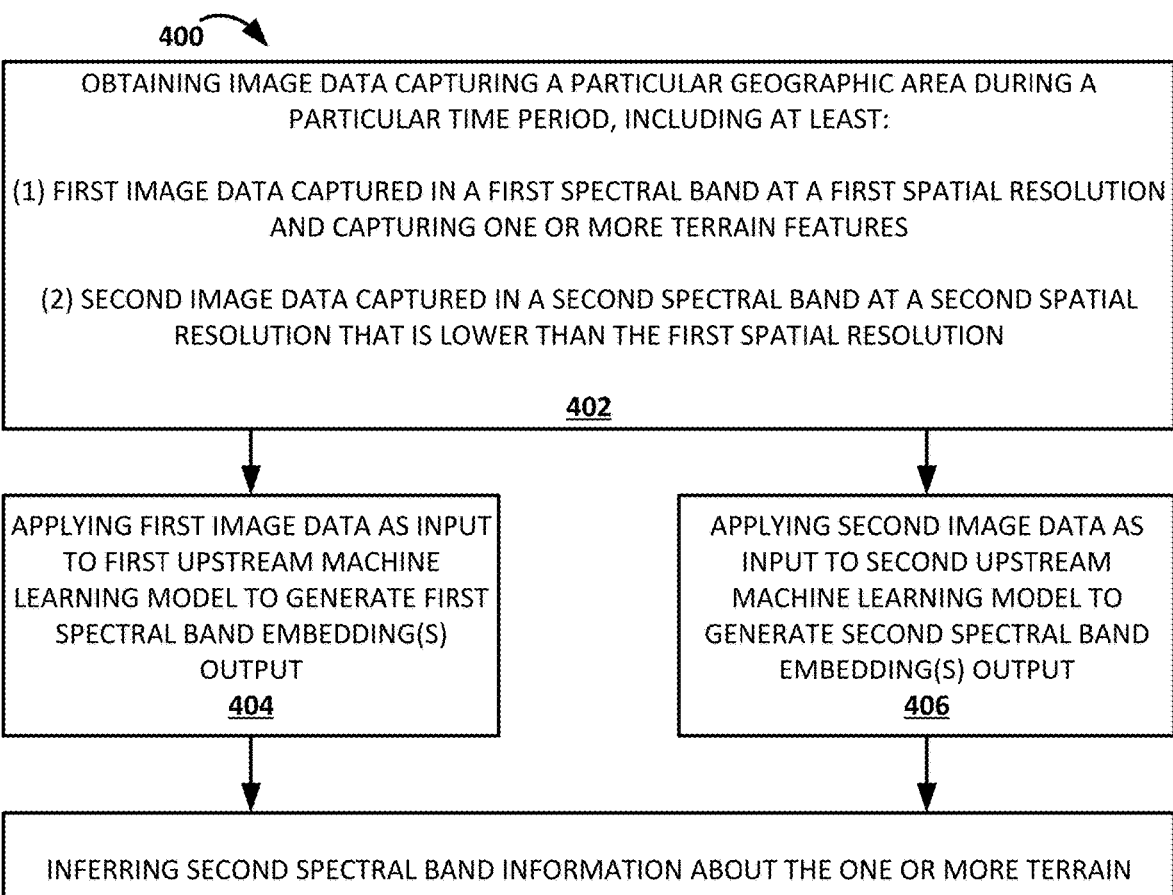

400

OBTAINING IMAGE DATA CAPTURING A PARTICULAR GEOGRAPHIC AREA DURING A PARTICULAR TIME PERIOD, INCLUDING AT LEAST:

(1) FIRST IMAGE DATA CAPTURED IN A FIRST SPECTRAL BAND AT A FIRST SPATIAL RESOLUTION AND CAPTURING ONE OR MORE TERRAIN FEATURES (2) SECOND IMAGE DATA CAPTURED IN A SECOND SPECTRAL BAND AT A SECOND SPATIAL RESOLUTION THAT IS LOWER THAN THE FIRST SPATIAL RESOLUTION

402

APPLYING FIRST IMAGE DATA AS INPUT TO FIRST UPSTREAM MACHINE LEARNING MODEL TO GENERATE FIRST SPECTRAL BAND EMBEDDING(S) OUTPUT
404

APPLYING SECOND IMAGE DATA AS INPUT TO SECOND UPSTREAM MACHINE LEARNING MODEL TO GENERATE SECOND SPECTRAL BAND EMBEDDING(S) OUTPUT
406

INFERRING SECOND SPECTRAL BAND INFORMATION ABOUT THE ONE OR MORE TERRAIN FEATURES OF THE PARTICULAR GEOGRAPHIC AREA, THE INFERRING INCLUDING:

APPLYING THE FIRST AND SECOND SPECTRAL BAND EMBEDDINGS AS INPUT TO A DOWNSTREAM MACHINE LEARNING MODEL TO GENERATE INFERRED EMBEDDING(S) AS OUTPUT
408A

GENERATING, BASED ON THE INFERRED EMBEDDING(S), INFERRED IMAGE DATA INCLUDING SUPER-RESOLUTION SECOND SPECTRAL BAND IMAGE DATA THAT CAPTURES THE ONE OR MORE TERRAIN FEATURES AT THE FIRST RESOLUTION
408B

500

OBTAINING IMAGE DATA CAPTURING A PARTICULAR GEOGRAPHIC AREA DURING A GIVEN TIME PERIOD, INCLUDING AT LEAST:

(1) FIRST IMAGE DATA CAPTURED IN A FIRST SPECTRAL BAND AT FIRST POINT(S) IN TIME DURING THE GIVEN TIME PERIOD AND CAPTURING ONE OR MORE TERRAIN FEATURES (2) SECOND IMAGE DATA CAPTURED IN A SECOND SPECTRAL BAND AT SECOND POINT(S) IN TIME DURING THE GIVEN TIME PERIOD
502

APPLYING FIRST IMAGE DATA AS INPUT TO FIRST UPSTREAM MACHINE LEARNING MODEL TO GENERATE FIRST SPECTRAL BAND EMBEDDING(S) OUTPUT
504

APPLYING SECOND IMAGE DATA AS INPUT TO SECOND UPSTREAM MACHINE LEARNING MODEL TO GENERATE SECOND SPECTRAL BAND EMBEDDING(S) OUTPUT
506

INFERRING SECOND SPECTRAL BAND INFORMATION ABOUT THE ONE OR MORE TERRAIN FEATURES OF THE PARTICULAR GEOGRAPHIC AREA, THE INFERRING INCLUDING:

APPLYING THE FIRST AND SECOND SPECTRAL BAND EMBEDDINGS AS INPUT TO A DOWNSTREAM MACHINE LEARNING MODEL TO GENERATE INFERRED EMBEDDING(S) AS OUTPUT
508A

GENERATING, BASED ON THE INFERRED EMBEDDING(S), INFERRED IMAGE DATA IN THE SECOND SPECTRAL BAND IMAGE DATA THAT CAPTURES THE ONE OR MORE TERRAIN FEATURES AT THE FIRST POINT(S) IN TIME DURING THE GIVEN TIME PERIOD
508B

INFERRING HIGH RESOLUTION IMAGERY

BACKGROUND

Vision data captured from high elevations, such as vision data captured by vision sensors of satellites deployed in near-earth orbits, is useful for a variety of agricultural monitoring purposes. Vision data that captures hundreds, thousands, or even tens of thousands of acres on a farm can be used by agricultural personnel to effectively monitor their crop fields (and/or other areas of their agricultural operations) to make various agricultural predictions and decisions, particularly when operational and/or other observational data describing terrain features in the fields is unavailable or unavailable for certain portions of the fields (in general, or at certain times). For example, it is beneficial to frequently observe agricultural fields for invasive species, declines in crop health, erosion, and/or irrigation monitoring purposes. As another example, it is beneficial to observe the response of crops to application of a new fertilizer or pesticide.

Vision data captured from high elevations, such as satellite imagery, manned aircraft (e.g., airplanes), or images captured by high elevation manned aircraft (e.g., space shuttles), are useful for a variety of agricultural monitoring processes. Acquiring digital imagery from high elevations allows large expanses of land to be captured in the imagery with relatively little effort or cost. This process is sometimes referred to as "remote sensing." On the other hand, there are challenges in using satellite imagery, such as the fact that the high-elevation vision data only captures certain areas at certain times, in certain spatial resolutions, at certain temporal resolutions, and in certain spectral bands. Thus, it may be difficult for agricultural personnel to make determinations and decisions based on the limited information available for a certain spectral band at a certain time or on a certain day.

SUMMARY

Vision data captured from high elevations, such as satellite imagery, images captured by high-elevation unmanned aerial vehicles (e.g., UAV "drones" or balloons), manned aircraft (e.g., airplanes), or images captured by high elevation manned aircraft (e.g., space shuttles), are useful for a variety of agricultural monitoring processes. For one thing, acquiring digital imagery from high elevations allows large expanses of land to be captured in the imagery with relatively little effort or cost. On the other hand, a challenge of satellite imagery is that various satellites capture various geographic areas at different points in time, at different frequencies, in different spectral bands, and/or at different spatial resolutions. Thus, the satellite images available that capture a given geographic area at a particular time and/or during a particular time period frequently fail to include certain spectral data, or fail to include certain spectral data at certain resolutions. Moreover, the images from the satellites that do capture the certain spectral data and/or the certain spectral data at the certain resolutions might only be available for certain dates/times.

For instance, first image data captured by a first satellite may include multispectral (e.g., RGB, near infrared) band information for a given geographic area at a 10 m spatial resolution and with relative high temporal frequency, but other bands of the first image data (e.g., B1, B9, B10) may have lower spatial resolutions (e.g., 20 m, 30 m, 60 m). Additionally or alternatively, second image data captured by a second satellite may capture various spectral band information for the area at only a 60 m spatial resolution and/or with relatively low frequency. Thus, it may ordinarily be difficult for agricultural personnel (and/or other remote sensing machine learning models used by such personnel) to make effective use of the lower resolution spectral bands of the data captured by the first or second satellite.

It is therefore desirable to leverage machine learning to extrapolate missing spectral, spatial, and/or temporal information for a given geographic area based on a plurality of high-elevation images captured by a plurality of different satellites in a plurality of spectral bands, at a plurality of spatial resolutions, and at a plurality of points in time. This process may be referred to as a "super-resolution" process. In various implementations, a network of machine learning models can be trained to generate the missing spectral, spatial, and/or temporal information about various terrain features in the given geographic area from the plurality of high elevation images by analyzing the overlap (or lack thereof) between the spectral, spatial, and/or temporal information that is included in the plurality of high-elevation images.

Accordingly, implementations are described herein for using a network of transformer machine learning models to generate inferred image data capturing terrain features of a given geographic area in certain spectral bands, at certain spatial resolutions, and/or at certain frequencies or points in time based on a plurality of high-elevation images that capture those terrain features in other spectral bands, at higher spatial resolutions, and/or at higher frequencies or certain other points in time.

In some implementations, this may be accomplished by using image data of a given spectral band and at a threshold spatial or temporal resolution as "ground truth" image data. This ground truth image data can be compared to image data which lacks certain spectral, spatial, or temporal information in order to extrapolate, or infer, the missing image data. That allows agricultural personnel and/or downstream remote sensing machine learning models to be better able to make inferences about the terrain conditions in the area using the inferred image data. Thus, for instance, imagery with high resolution and/or frequency RBG spectral data can be leveraged to infer other spectral bands that are included in the imagery, except at lower resolutions and/or frequencies.

In some implementations, generating this inferred image data may be accomplished using image data capturing a particular geographic area during a particular time period. This high-elevation image data can include at least: (1) first image data that depicts one or more terrain features of the particular geographic area captured in a first spectral band at a first spatial resolution, and (2) second image data captured in a second spectral band at a second spatial resolution that is lower than the first spatial resolution. The first image data and the second image data may then be processed using corresponding upstream transformer machine learning models that output corresponding sets of spectral band embeddings, which semantically represent terrain features and other visual attributes captured by the corresponding set of image data.

These sets of spectral band embeddings can then be used to infer second spectral band information about the terrain features that were originally captured in the first spectral band, by the first image data. In some implementations, this can be accomplished by applying the sets of spectral band embeddings as input(s) to a downstream transformer machine learning model to generate, as output, inferred embedding(s) that include semantic information that corresponds to both the first spectral band and the second spectral band, and generating inferred image data based on the inferred embedding(s) that includes super-resolution second spectral band image data capturing the terrain features that were originally captured in the first spectral band at the first resolution, in the second spectral band but at the first resolution.

In some implementations, the first image data and the second image data may include high-elevation imagery captured by one or more satellites.

In some implementations, the first image data and second image data can be associated with corresponding first temporal data and second temporal data (respectively) which indicate first/second points in time during a given time period at which corresponding instances of first/second image data were captured. The first points in time can differ from the second points in time. In some implementations, the first/second spectral band embeddings will also include corresponding spatial and temporal information. In some implementations, the corresponding inferred image data of the second spectral band can also capture the terrain features at the first or second particular points in time and/or at the first or second spatial resolution.

In some implementations, the first image data and/or second image data can be applied to a respective upstream transformer machine learning model as corresponding time-series image data.

In some implementations, generating the inferred image data in the second spectral band and at the first resolution can be performed further based on upsampling the second image data to the first resolution.

In some implementations, the second image data may be upsampled to the first resolution before it is applied as input to the second upstream transformer machine learning model.

In some implementations, the first and second spectral band embeddings can be concatenated to generate a combined embedding which may then be provided as the input to the downstream transformer machine learning model.

In addition, some implementations include one or more processors (e.g., central processing unit(s) (CPU(s)), graphics processing unit(s) (GPU(s)), and/or tensor processing unit(s) (TPU(s)) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 4 illustrates a flowchart of an example method for practicing selected aspects of the present disclosure.

FIG. 5 illustrates a flowchart of an example method for practicing selected aspects of the present disclosure.

DETAILED DESCRIPTION OF THE DRAWINGS

Figure 1:
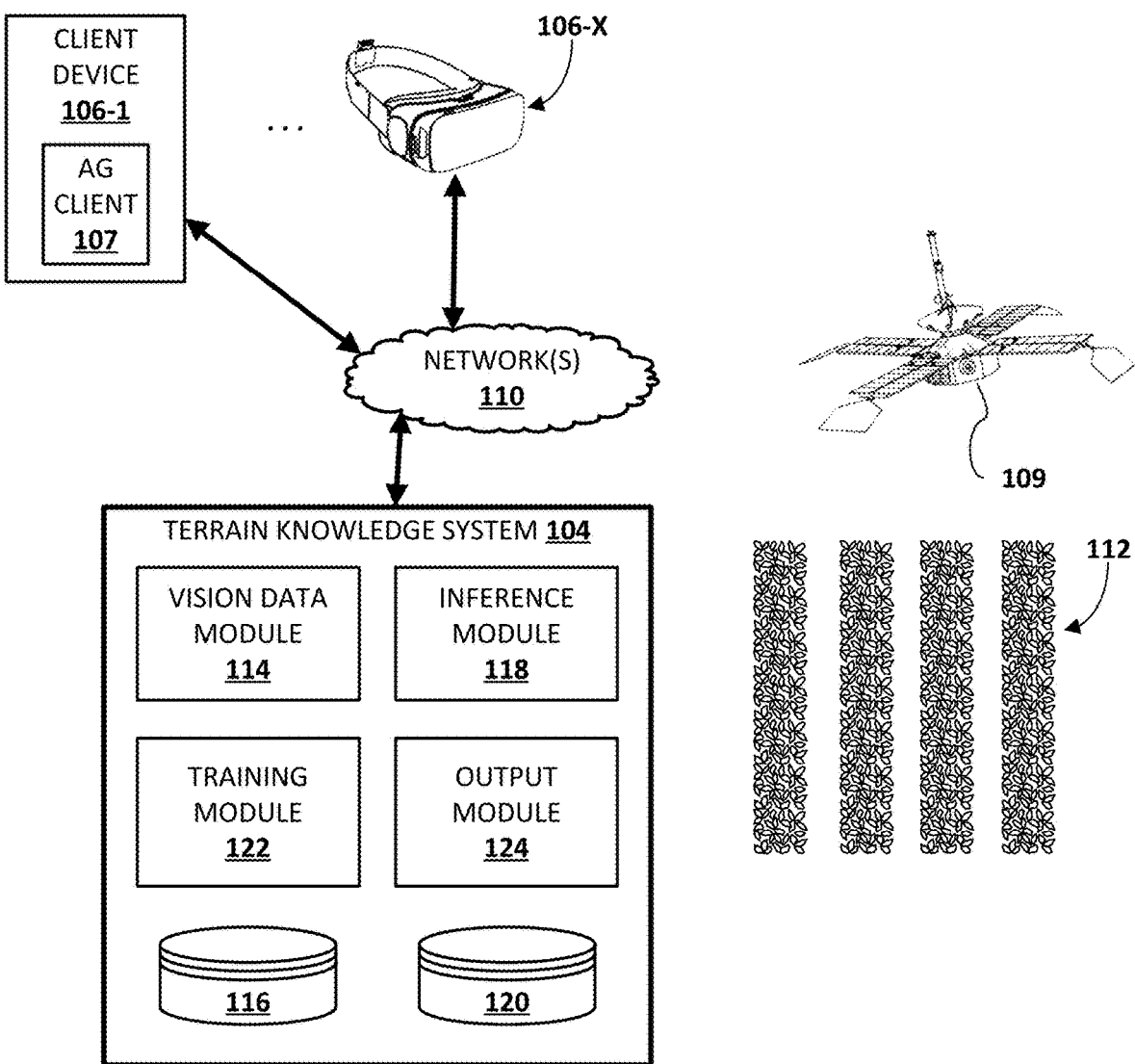
FIG. 1 schematically illustrates an environment in which one or more selected aspects of the present disclosure may be implemented, in accordance with various implementations.

FIG. 1 schematically illustrates an environment in which one or more selected aspects of the present disclosure may be implemented, in accordance with various implementations. The example environment includes agricultural areas 112 and various equipment that may be deployed at or near those areas, as well as other components that may be implemented elsewhere, in order to practice selected aspects of the present disclosure. Various components in the environment are in communication with each other over one or more networks 110. Network(s) 110 may take various forms, such as one or more local or wide area networks (e.g., the Internet), one or more personal area networks ("PANs"), one or more mesh networks (e.g., ZigBee, Z-Wave), etc.

Agricultural areas 112 may include agricultural fields displaying a myriad of terrain features and being used to grow various types of crops that may produce plant parts of economic and/or nutritional interest. Agricultural areas 112 may include, for instance, one or more crop fields, one or more plots, one or more gardens, one or more greenhouses, or any other areas in which there may be an interest or desire to automatically detect, classify, and/or segment terrain features. "Terrain features" may include, for instance, color of terrain, texture of terrain, type of terrain, layout of terrain, plant conditions, and any other geographical features of the agricultural areas 112 detectable in high-elevation satellite imagery captured in any spectral band and at any spatial or temporal resolution.

Terrain types (or "classes") may include indications of various terrain media (e.g., soil, water, sand, snow, ice, etc.). Terrain colors and textures include colors and textures of image data capturing the terrain. Terrain layout, for example, can include degree of slant or slope, overlaps or gradients between terrain features, etc. Plant conditions may include plant or crop type (e.g., genus, species), plant or crop density, foliage levels, presence-or-absence of plants having certain attributes, etc. As one non-limiting example, there may be considerable interest and/or benefit in tracking plant density in agricultural areas 112 in which certain crops are being grown. Once a significant change in plant density is noted, agricultural personnel or farm machinery can be deployed to investigate or remediate fields in the agricultural areas (e.g., to confirm or correct a weed infestation).

An individual (which in the current context may also be referred to as a "user") may operate one or more client devices 106-1 to 106-X to interact with other components depicted in FIG. 1. A client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus that includes a computing device, such as a head-mounted display ("HMD") 106-X that provides an AR or VR immersive computing experience, a "smart" watch, and so forth. Additional and/or alternative client devices may be provided.

Terrain knowledge system 104 is an example of an information system in which the techniques described herein may be implemented. Each of client devices 106 and terrain knowledge system 104 may include one or more memories for storage of data and software applications, one or more processors for accessing data and executing applications, and other components that facilitate communication over a network. The operations performed by client device 106 and/or terrain knowledge system 104 may be distributed across multiple computer systems.

Each client device 106 may operate a variety of different applications that may be used to perform various agricultural tasks, such as crop monitoring and diagnosis. For example, a first client device 106-1 operates agricultural ("AG") client 107 (e.g., which may be standalone or part of another application, such as part of a web browser). Another client device 106-X may take the form of a HMD that is configured to render 2D and/or 3D data to a wearer as part of a VR immersive computing experience. For example, the wearer of client device 106-X may be presented with 3D point clouds representing various aspects of objects of interest, such as edges and boundaries between various colors, textures, typesm, and elevations of terrains. The wearer may interact with the presented data, e.g., using HMD input techniques such as gaze directions, blinks, etc.

In some implementations, AG client 107 may be used to present to agricultural personnel instructions and/or information that can help them perform various agricultural tasks, such as predicting crop yields, seeking recommendations for crop management, scouting crop fields for potential expansion, etc. For example, output module 124 (described in more detail below) may generate a report, a map, an image, instructions, and/or any other data that may be presented to an operator of a client device using a graphical user interface, audibly, etc. These data may inform the agricultural personnel where fields having certain terrain features (e.g., unexpected levels of plant or foliage density, erosion, flooding, etc.) are located, so that agricultural personnel can better determine which action(s) should be taken on those portions of the terrain.

Vision sensors (e.g., 2D digital cameras, 3D cameras, 2.5D cameras, infrared cameras, etc.) can be deployed at or above near-earth orbit elevation levels via one or more satellites 109. Satellite image vision data gathered in this manner can be used to remotely sense various terrain features in a given geographic area, as described herein. The satellite image vision data can be gathered by one or more vision sensors deployed on one or more satellites, and can include image data captured at various points in time, in various spectral bands, and at various spatial resolutions.

In various implementations, terrain knowledge system 104 may be implemented across one or more computing systems that may be referred to as the "cloud." Terrain knowledge system 104 may receive the vision data generated by one or more satellites 109 captured at various points in time, in various spectral bands, and/or at various spatial resolutions and process it using one or more transformer machine learning models, as will be described in more detail below, to generate synthetic, "super-resolution" image data. The synthetic super-resolution image data may depict one or more of the terrain features of a given geographic area in one or more spectral bands at one or more resolutions/frequencies that were previously unavailable in those one or more spectral bands.

Moreover, in processing this high-elevation vision data, terrain knowledge system 104 can employ various image processing techniques to perform tasks such as detection, classification, and/or segmentation of plants, plant conditions, and other terrain features. Thus, the final output "super-resolution" image data can include indications of various terrain features that terrain knowledge system 104 has detected, classified, and/or segmented based on processing the input satellite imagery and/or the output "super-resolution" image data (and/or embedding(s) representing such imagery).

In various implementations, terrain knowledge system 104 may include a vision data module 114, an inference module 118, a training module 122, and the aforementioned output module 124. Any of modules 114, 118, 122, and/or 124 may be implemented using any combination of hardware and software. In some implementations one or more of modules 114, 118, 122, and/or 124 may be omitted, combined, and/or implemented in a component that is separate from terrain knowledge system 104.

Terrain knowledge system 104 may also include one or more databases. For example, terrain knowledge system 104 may include, in communication with vision data module 114, an imagery database 116 for storing image data captured by, for instance, agricultural personnel, farm machinery, and/or satellite 109. Terrain knowledge system 104 may also include a machine learning model database 120 that includes the various machine learning models described herein. For example, database 120 can include various machine learning models trained to detect terrain features and/or determine relationships between spectral, spatial, and temporal information included in input imagery. In this specification, the term "database" and "index" will be used broadly to refer to any collection of data. The data of the database and/or the index does not need to be structured in any particular way and it can be stored on storage devices in one or more geographic locations.

Vision data module 114 may be configured to obtain digital images and/or other imagery data from various sources, such as imagery database 116 purposed as an imagery clearinghouse, as well as from sources such as satellite(s) 109 and/or image repositories containing high-elevation images captured by satellite(s). Vision data module 114 may then provide this imagery data to inference module 118 and/or to training module 122. In other implementations, vision data module 114 may be omitted and the functions described herein as being performed by vision data module 114 may be performed by other components of terrain knowledge system 104, such as inference module 118 or training module 122.

Inference module 118 may be configured to employ the various machine learning models stored in machine learning model database 120 to process the imagery obtained from vision data module 114 and/or imagery database 116. For example, inference module 118 may use one or more machine learning models to process one or more instances of input satellite imagery to upsample/downsample a spatial or temporal resolution of the input imagery, to impute missing values or remove obstructions in the input imagery, and/or to generate embeddings that semantically describe captured terrain features and/or spectral, spatial, and/or temporal relationships of image data included in the input imagery.

Training module 122 may be configured to train the machine learning models stored in machine learning model database 120 based on comparing the output synthetic "super-resolution" image data to ground truth low-elevation image data corresponding to the same geographic area and further training one or more of the machine learning models described herein based on the differences and/or errors (e.g., using techniques such as gradient descent, back propagation, etc.). In such implementations, ground truth low-elevation image data may be obtained from, for example, imagery database 116 which receives such images from agricultural personnel operating vision sensors mounted on farm machinery or unmanned aerial vehicles ("UAVs") via AG client 107 of client device 106. Therefore, while any of the machine learning models described herein may be pre-trained to generate the certain kinds of embeddings, inferences, and/or other image data as described in more detail below with respect to FIGS. 2-5, training module 122 may further train one or more of these machine learning models to be more accurate.

In various implementations, various machine learning models described herein may be used by inference module 118 to process the satellite images in order to generate synthetic "super-resolution" image data at a greater spatial and/or temporal resolution than the original satellite images. Inference module 118 can therefore "infer" image data capturing terrain features X, Y, and Z in spectral band A at a spatial resolution of 10 m based on processing satellite images (or representative embeddings) that, for example, capture terrain feature X in spectral band B at a spatial resolution of 10 m, capture terrain features Y and Z in spectral band C at a spatial resolution of 20 m, and capture a fuzzy outline of terrain feature Z in spectral band A at a spatial resolution of 30 m.

For example, in some implementations, inference module 118 can apply imagery data obtained from vision module 114 as inputs across a group of neural networks stored in machine learning model database 120 to generate output synthetic "super-resolution" image data. This output synthetic "super-resolution" image data may depict the various terrain features that are detected based on the input satellite image data. However, this output synthetic "super-resolution" image data can also include additional synthetic spectral, spatial, and/or temporal information with respect to these various terrain features, compared to the input satellite imagery data. One or more of the neural networks stored in database 120 may be pre-trained to infer terrain features of agricultural area(s) 112 captured in satellite imagery. Moreover, in some implementations described herein, one or more of the neural networks may infer a change or rate of change in one or more of the terrain features captured in one or more time-stamped sequences of the ground truth satellite images and/or the generated synthetic "super-resolution" image data.

Various types of machine learning models may be used to process the image data and infer, classify, and/or segment terrain features, such as a feed forward neural network, convolutional neural networks ("CNN"), a recurrent neural network, a long short-term memory ("LSTM") neural network, a gated recurrent unit ("GRU") neural network, various types of transformers, etc. For example, in some implementations, one or more convolutional neural networks ("CNNs") may be trained to generate output indicative of the presence and/or absence of certain terrain attributes depicted in low elevation and/or satellite imagery. As another example, in some implementations, a time-series machine learning model such as a recurrent neural network ("RNN") may be trained to process sequences of satellite images to generate output indicative of certain terrain features or attributes, and/or indicative of changes or rates of change of certain terrain features or attributes over time.

Inference module 118 may pass data indicative of the inferred image data capturing the terrain features in a given agricultural area 112, which in some implementations may include real high-elevation (i.e., satellite) image data alongside the inferred synthetic "super-resolution" image data of the agricultural area 112, to various downstream processes. For example, inference module 118 may process the synthetic super-resolution high elevation imagery, e.g., in conjunction with the ground truth high elevation imagery, using a train terrain classification machine learning model to classify areas on the ground that correspond to pixels of high elevation imagery into different terrain classes.

In some implementations, output module 124 may be configured to provide the inferred image data—or other data computed based at least in part upon the inferred image data—to one or more client devices 106 via AG clients 107 over network(s) 110. In some implementations, output module 124 may additionally or alternatively provide the inferred image data to one or more remote servers or databases via network(s) 110, and AG clients 107 on client devices 106 may obtain access to the inferred image data from the one or more remote servers or databases. In some implementations, one or more agricultural robots or autonomous rovers may be deployed based on the inferred terrain features. For example, if significant changes to certain terrain features happen at a threshold rate, rover(s) or aerial drones may be deployed to the affected areas of agricultural field 112 to gather soil samples or additional low-elevation image data that may help agricultural personnel to diagnose a potential problem (e.g., which plant disease is causing the defoliation in a given field).

In some implementations, AG client 107 installed on one or more client devices 106 can provide ground truth and/or inferred image data for display on the user interface of the client device(s) 106. In such implementations, agricultural personnel can provide user input to the user interface selecting at least a portion of one or more instances of high-elevation image data (e.g., selecting a portion of a synthetic high-elevation image), and AG client 107 can provide user selection data indicating the user selection to terrain knowledge system 104. In response to receiving this indication of a user selection, inference module 118 or output module 124 can then provide, for display on the user interface of the client device(s) 106 via AG client(s) 107, one or more instances of ground truth or inferred image data depicting terrain features relevant to the portion of the agricultural area 112 that corresponds to the user selection. Additionally or alternatively, in some implementations, determined terrain features may be relayed to agricultural personnel in other manners that communicate terrain conditions and corresponding locations in one or more fields, such as an annotated grid or a textual report.

Figure 2:
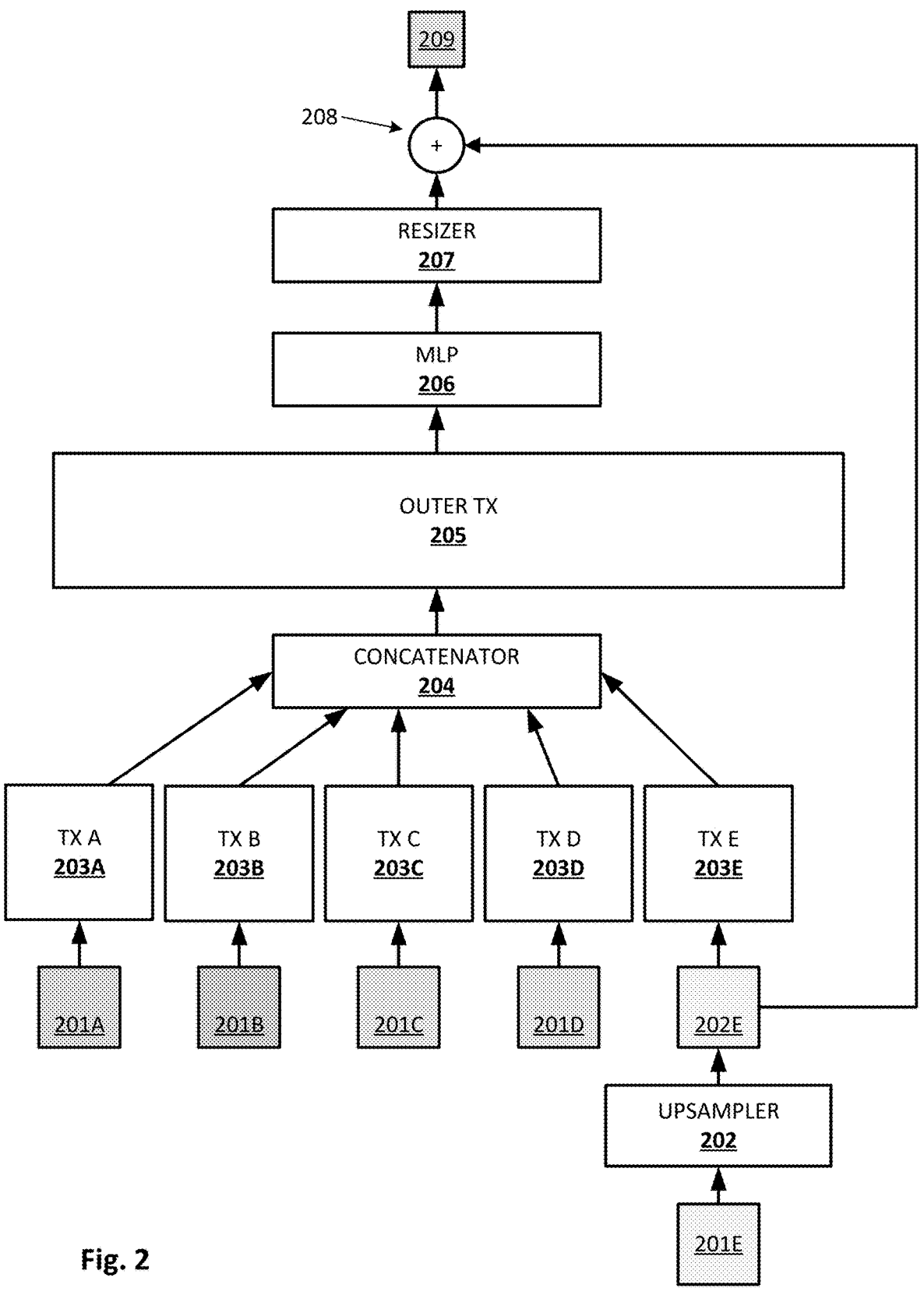
FIG. 2 is a block diagram that illustrates an example environment in which one or more selected aspects of the present disclosure may be implemented, in accordance with various implementations described herein.

FIG. 2 is a block diagram that illustrates an example environment in which one or more selected aspects of the present disclosure may be implemented, in accordance with various implementations described herein. The elements depicted in FIG. 2 may be implemented across various components of various computer systems, such as one or more components of computing system(s) that implement terrain knowledge system 104. Moreover, while techniques described with respect to FIG. 2 may be discussed in a particular order, this is not meant to be limiting. One or more techniques discussed herein may be reordered, omitted or added.

The example environment of FIG. 2 includes transformers A-E (203A-203E, respectively), upsampler 202, concatenator 204, outer transformer 205, multi-layer perceptron (MLP) 206, resizer 207, and aggregation model 208. Although transformers A-E (203A-203E, respectively) are depicted as single transformer machine learning models upstream from outer transformer 205, it should be appreciated that, in some implementations, each of the upstream transformers A-E (203A-203E, respectively) and the downstream outer transformer 205 may comprise its own upstream/downstream transformer network. Moreover, in some implementations, one or more other types of machine learning models described herein may supplement or replace any of the upstream or downstream transformers described with respect to FIG. 2. Image data 201A-201E and 202E, and inferred image data 209 of the example environment of FIG. 2 represent various instances of high-elevation image data of various spectral bands, and at various spatial resolutions.

Image data 201A includes high-elevation image data captured in Spectral Band A, for example the Red Band, and in a first spatial resolution, for example 10m. Image data 201B includes high-elevation image data captured in Spectral Band B, for example the Green Band, and in the first spatial resolution (e.g., 10 m). Image data 201C includes high-elevation image data captured in Spectral Band C, for example the Blue Band, and in the first spatial resolution (e.g., 10 m). Image data 201D includes high-elevation image data captured in Spectral Band D, for example the Near Infra-Red (NIR) Band, and in the first spatial resolution (e.g., 10 m). Image data 201E includes high-elevation image data captured in Spectral Band E, for example the Red Edge Band, and in a second, lower spatial resolution, for example 20m.

Image data 201E can be upsampled by upsampler 202 to generate upsampled image data 202E, which includes the image data 201E in Spectral Band E (e.g., Red Edge) upsampled to the first spatial resolution (e.g., 10 m) shared by image data 201A-201D. Instances of image data 201A-201D and 202E can correspond to the same geographic area, for example the same 10 m×10 m geographic area, captured by one or more satellites at one or more dates/times. However, instances of image data 201E can correspond to a larger geographic area that contains that same geographic area that image data 201A-201D and 202E correspond to. For example, image data 201E can correspond to a 20 m×20 m geographic area in which that 10 m×10 m geographic area lies.

Image data 201A can be applied as input to transformer A 203A to generate one or more Spectral Band A embeddings that semantically represent one or more terrain features of a corresponding geographical area determined based on processing the Spectral Band A (e.g., Red Band) information included in image data 201A. Likewise, image data 201B, 201C, 201D, and 202E can be processed by their respective transformers B-E (203B-203E, respectively) to generate spectral band embeddings corresponding to their respective spectral bands (Spectral Bands B-E, respectively) that semantically represent one or more terrain features of the corresponding geographical area. Note that the same or different terrain features may be present in varying amounts of detail in the instances of image data 201A-202E input to the transformers A-E. Thus, for example, the Spectral Band B (e.g., Green Band) embeddings may semantically describe different terrain features, or semantically describe the terrain features in different ways, compared to the Spectral Band E (e.g., Red Edge) embeddings. "Terrain features", as used herein, may include, for instance, color of terrain, texture of terrain, type of terrain, layout of terrain, plant conditions, and any other geographical features of the agricultural areas 112 detectable in high-elevation satellite imagery captured in any spectral band and at any spatial or temporal resolution.

The spectral band embeddings corresponding to Spectral Bands A-E can then be applied as inputs to the concatenator 204 which can concatenate the embeddings into a single embedding that aggregates the information included in the spectral band embeddings for each Spectral Band A-E. This single embedding is then applied as input to outer transformer 205 as input to generate, as output, one or more descriptive embeddings that semantically describe the relationships between the instances of terrain feature information that correspond to each of the Spectral Bands A-E. In this way, individual transformers A-E (203A-203E, respectively) can be used to determine terrain feature information corresponding to each available spectral band, and the outer transformer 205 can be used to determine the relationships between the terrain feature information described by the spectral band embeddings. Note that in some implementations, concatenator 204 may be removed and outer transformer 205 may take the spectral embeddings generated by transformers A-E (203A-203E, respectively) directly as inputs. This can allow outer transformer 205 to generate descriptive embeddings that include more semantic information (e.g., information that is otherwise lost or skewed during concatenation), but may also insert more room for misinterpretation. However, such a system may be advantageous when dealing with low spatial resolution images as the images (or portions thereof) of each spectral band may contain little information by themselves, and therefore the semantic information included in their respective embeddings may be more easily skewed by concatenation. Moreover, using images (or portions thereof) from many spectral bands can help to ameliorate the risk of extraneous or illogical information being included in (or omitted from) the output descriptive embeddings of the outer transformer 205 (e.g., information for each spectral band is compared to each other, thus more spectral bands means more "double checks").

The one or more descriptive embeddings output by the outer transformer network 205 are then applied as input to MLP 206. MLP 206 is a multilayer perceptron network that receives the descriptive embeddings as input and then generates, as output, one or more correlative embeddings that represent the correlations (and/or dependencies) between the relationships identified in the descriptive embeddings. Thus MLP 206 generates output correlative embeddings that describe, for example, correlations (and/or dependencies) between how and where certain terrain features are visually represented in Spectral Bands A, B, C, and/or D compared to how and where they are (or are not) visually represented in Spectral Band E.

The correlative embeddings output by MLP 206 can then be applied as inputs to resizer 207. Resizer 207 may be any machine learning model or other algorithmic process that processes and resizes the one or more correlative embeddings output by the MLP 206 to generate one or more representative image embeddings that expand the spatial and spectral relationship information included in the correlative embeddings to a size representative of the image data 201A-201C, 202D that is fed into the transformers A-E (203A-203E, respectively).

At least one of the one or more representative embeddings can then be combined with an instance of the upsampled image data 202E by aggregation model 208 to generate inferred image data 209. Aggregation model 208 can be any machine learning model trained to take, as inputs, one or more representative embeddings and one or more corresponding instances of upsampled image data 202E in order to generate, as output, inferred image data 209 that depicts the terrain features captured by image data 201D (and/or 202D) as well as one or more of the terrain features captured by image data 201A-201D (if they are different than the terrain features captured by image data 202D and/or 201D) and/or additional detail of the terrain features that were captured by image data 201D but that were captured in more detail in one of the other Spectral Bands A-D in their corresponding instances of image data 201A-201D. Moreover, the output the inferred image data 209 generated by the aggregation model 208 will include image data in Spectral Band E and at the first (higher) spatial resolution (e.g., 10 m) that corresponds to the spatial resolution of the image data 201A-201D and 202E that were applied as inputs to transformers A-E.

Although FIG. 2 depicts five initial instances of image data 201A-201E corresponding to five different Spectral Bands A-D, it should be appreciated that the processes described with respect to FIG. 2 may be performed with any two or more initial instances of image data each corresponding to any number of spectral bands by simply adding or removing additional or unneeded transformers. It should also be appreciated that one or more of the other initial instances of image data 201A-201D may also correspond to a different level of spatial resolution (higher/lower than the first spatial resolution) and may be upsampled or downsampled to the first spatial resolution before being applied to a corresponding transformer A-D. In some such implementations, the upsampled/downsampled image data may be treated much the same way image data 202E is in FIG. 2, and the output inferred image data 209 may include image data of multiple spectral bands, for example each spectral band that corresponds to an instance of image data that was upsampled or downsampled before being applied to one of the transformers A-E. Additionally or alternatively, as will be discussed below in more detail with respect to FIG. 3, similar architecture and processes as those described above with respect to FIG. 2 may be used to increase the temporal resolution of image data corresponding to certain spectral bands. Moreover, in some implementations, upsampler 202 may be optional, for example if transformer E, concatenator 204, and/or aggregation model 208 is trained to upsample the image data and/or the data included in one or more of the corresponding input embeddings, or if one or more of the machine learning models downstream from the concatenator in the example environment of FIG. 2 is trained to insert/interpret/ignore null values that are included in or indicated by the embeddings.

Thus, for example, one or more satellites capture instances of image data 201A-201E in spectral bands corresponding to, respectively, the red band (A), the green band (B), the blue band (C), the near infrared band (D), and the red edge band (E). The instances of image data 201A-201D, which respectively correspond to the spectral bands A-D, may be of a higher spatial resolution of 10 m. However, the instance of image data 201E that corresponds to the red edge band may only be captured in a 20 m spatial resolution. Image data captured in the red edge band is very useful to agricultural personnel, as it captures information reflective of nitrogen and chlorophyll content in an agricultural area. Agricultural personnel may therefore desire to have red edge band image data at a 10 m spatial resolution, which will include more and more precise detail than the red edge band image data at the 20 m spatial resolution. As described above, the red edge band image data 201E may be upsampled to the 10 m resolution and applied as input to transformer E 203E while instances of image data 201A-201D are applied to their respective transformers A-D. Each of the resulting spectral band embeddings output by transformers A-E can then be applied as input to concatenator 204 to generate a combined embedding which combines the various information gleaned from each of the spectral bands A-E. This combined embedding can be applied as input to the outer transformer 205 to generate the descriptive embeddings which may semantically describe, for example, how each detected terrain feature is (or is not) represented in each of the spectral bands A-E. The descriptive embeddings may be applied as input to MLP 206 to generate the correlative embeddings that indicate the overlaps and omissions between the representations of each terrain feature for each spectral band. For example, the correlative embeddings can indicate that terrain feature A is captured by both spectral bands A and E, as well as describe the correlations and/or dependencies between how terrain feature A is represented in Spectral Band A versus how it is represented in Spectral Band E. These correlative embeddings can then be resized by resizer 207 to generate representative image embeddings, which can be used by aggregation model 208 alongside the upsampled image data 202E to infer the synthetic "super-resolution" image data 209 at the 10 m spatial resolution. This synthetic "super-resolution" image data 209 may, for example, more clearly and sharply depict terrain feature A in the red edge band compared to the input image data 201E and/or the upsampled image data 202E.

Figure 3:
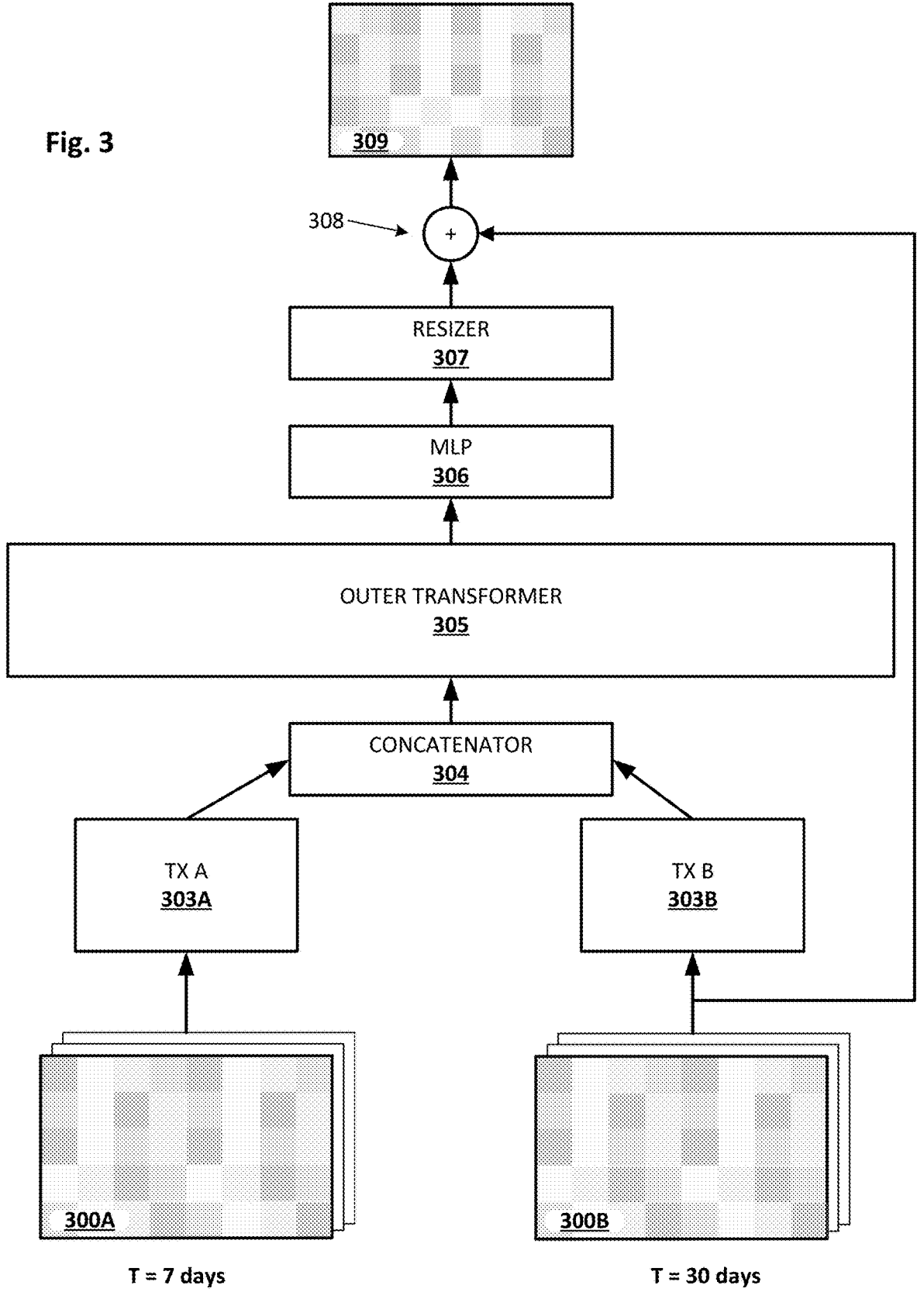
FIG. 3 is a block diagram that illustrates an example environment in which one or more selected aspects of the present disclosure may be implemented, in accordance with various implementations described herein.

FIG. 3 is a block diagram that illustrates an example environment in which one or more selected aspects of the present disclosure may be implemented, in accordance with various implementations described herein. The elements depicted in FIG. 3 may be implemented across various components of various computer systems, such as one or more components of computing system(s) that implement terrain knowledge system 104. Moreover, while techniques described with respect to FIG. 3 may be discussed in a particular order, this is not meant to be limiting. One or more techniques discussed herein may be reordered, omitted or added.

The example environment of FIG. 3 includes transformers A-B (303A-303B), concatenator 304, outer transformer 305, MLP 306, resizer 307, and aggregation model 308. Although transformers A-B (303A-303B, respectively) are depicted as single transformers upstream from outer transformer 305, it should be appreciated that, in some implementations, each of the transformers A-B (303A-303B, respectively) and the outer transformer 205 may comprise its own upstream/downstream transformer network. Moreover, in some implementations, one or more of the other types of machine learning models described herein may be used to supplant or replace any of the transformers A-B (303A-303B) or outer transformer 305. Image data 300A and 300B, and inferred image data 309 of the example environment of FIG. 3 represent various instances of high-elevation image data of various spectral bands, and at two or more different temporal resolutions.

For example, Satellite A (not depicted) may capture high-elevation image data 300A of a particular geographic area in the near infrared (NIR) spectral band every 7 days. Meanwhile, Satellite B (not depicted) may capture high-elevation image data 300B of the particular geographic area in the red edge spectral band every 30 days. Each of image data 300A and image data 300B may capture visual attributes of the terrain of the particular geographic area, many of which may correspond to one or more terrain features of the particular geographic area. Moreover, each of image data 300A and image data 300B may include or be associated with corresponding temporal data (e.g., respective timestamps) indicating particular times at which each image was captured. For a particular time period, for example a month-long time period, image data 300A corresponding to the image data with the higher temporal frequency will include a certain minimum number of images captured at one or more first particular times during the time period that differ from the one or more second particular times during the time period at which the images included in image data 300B were captured. Thus, for example, image data 300A (e.g., 4 images) corresponding to the capture rate of Satellite A (e.g., 7 days) will include at least three images captured at different points in time during a particular month compared to image data 300B, which only has one image and therefore one point in time during the particular month corresponding to the image capture. Alternatively, the remaining image included in image data 300A may also be captured at a different time than the sole image included in image data 300B. Thus, in some embodiments, the timestamps of image data 300A and the timestamp(s) of image data 300B may all correspond to different points in time during a particular month, or other particular time period.

The system of FIG. 3 can leverage the higher temporal resolution image data 300A captured in the NIR spectral band and the red edge spectral band information included in the lower temporal resolution image data 300B to infer image data 309 that includes red edge spectral band information for the particular geographic area at the higher temporal resolution that corresponds to the temporal resolution of image data 300A. For example, if first temporal data associated with image data 300A indicates that images were captured on the 7th, 14th, 21st, and 28th of a given month, and second temporal data associated with image data 300B indicates that image(s) were captured on the 15th of the month, then the system of FIG. 3 can infer image data 309 including red edge spectral band image data corresponding to how Satellite B would have captured the corresponding geographical area on the 7th, 14th, 21st, and 28th of the given month. Alternatively or additionally, the inferred image data 309 may capture the corresponding geographic at a time between two points in time when Satellite A or Satellite A and Satellite B captured images, for example inferred image data 309 may include red edge spectral band image data corresponding to how Satellite B would have captured the geographic area on the 16th of the given month.

In the example environment of FIG. 3, image data 300A and 300B are two sets of image data that capture the same geographical area and correspond to the same spatial resolution. However, it should be appreciated that this is for exemplary purposes only and nothing in this disclosure should be interpreted as limiting the input image data to only two sets, to separate spectral bands, to the same spatial resolution, or to the exact same geographical area. For example, in some implementations, one or more additional machine learning models (e.g., upsampler 202) may pre-process instances of input image data to generate geographically or spectrally shifted and/or upsampled/downsampled image data (and/or representative embeddings of such input image data). Additionally or alternatively, one or more of the machine learning models depicted in FIG. 3 may include one or more of the machine learning models of FIG. 2, or may be trained in a similar manner, such that the machine learning models depicted in FIG. 3 may determine spectral data, relationships, correlations, discrepancies, and/or embeddings with respect to both space and time.

Image data 300A can be applied as input to transformer A 303A to generate one or more NIR spectral band embeddings that semantically represent one or more terrain features of the corresponding geographical area determined based on processing image data 300A. Likewise, image data 300B can be processed by transformer B 303B to generate red edge spectral band embeddings that semantically represent one or more terrain features (which may be the same or different terrain features as the terrain features determined for Spectral Band(s) A) of the corresponding geographical area. "Terrain features" may include, for instance, color of terrain, texture of terrain, type of terrain, layout of terrain, plant conditions, and any other geographical features of the agricultural areas 112 detectable in high-elevation satellite imagery captured in any spectral band and at any spatial or temporal resolution. Moreover, the NIR spectral band embedding(s) and the red edge spectral band embedding(s) may include or be labeled with temporal data corresponding to the above mentioned respective timestamps.

The spectral band embeddings corresponding to the NIR and the red edge spectral bands can then be applied as inputs to the concatenator 304 which can concatenate the embeddings into a single embedding that aggregates the information included in the spectral band embeddings. For example, in some implementations, each spectral band embedding may be equivalent to a single vector that includes or is labeled with a corresponding temporal value, and concatenator 304 may use these "single vector embeddings" to generate a single embedding equivalent to a matrix in which each column corresponds to one of the "single vector embeddings", and/or to a mathematical relationship between two or more of the "single vector embeddings", and also corresponds to a particular point in time. In some implementations, this single embedding generated by concatenator 304 may represent the overlap, and/or the difference, between the temporal and/or terrain feature information of the NIR spectral band embeddings and the red edge spectral band embeddings. This single embedding is then applied as input to outer transformer 305 as input to generate, as output, one or more descriptive embeddings that semantically describe the spectral and temporal relationships between the instances of terrain feature information that correspond to the two sets of input image data 300A and 300B. In this way, individual transformers A-B (303A-303B) can be used to determine terrain feature information corresponding to each available spectral band, and the outer transformer 305 can be used to determine the relationships between the different instances of terrain feature information that correspond to each of/all the available spectral bands. Note that in some implementations, concatenator 304 may be removed and outer transformer 305 may take the spectral embeddings generated by transformers A-B (303A-303B, respectively) directly as inputs.

The one or more descriptive embeddings output by the outer transformer 305 are then applied as input to MLP 306. MLP 306 is a multilayer perceptron network that receives, as input, the descriptive embeddings and generates, as output, one or more correlative embeddings that represent the correlations (and/or dependencies) between the relationships identified in the descriptive embeddings. Thus MLP 206 generates output correlative embeddings that describe, for example, correlations (and/or dependencies) between how and when certain terrain features are visually represented in the NIR spectral band compared to how and when they are (or are not) visually represented in the red edge spectral band.

The correlative embeddings output by MLP 306 can then be applied as inputs to resizer 307. Resizer 307 may be any machine learning model or other algorithmic process that processes and resizes the one or more correlative embeddings output by the MLP 306 to generate one or more representative image embeddings that expand the temporal and spatial relationship information included in the correlative embeddings to a size representative of the image data 300A-300B that is fed into the transformers A-B (303A-303B, respectively).

At least one of the one or more representative embeddings can then be combined with the image data 300B corresponding to the lower temporal resolution by aggregation model 308 to generate inferred image data 309. Aggregation model 308 can be any machine learning model trained to take, as inputs, one or more representative embeddings and one or more corresponding instances of image data in order to generate, as output, inferred image data 309 that includes red edge spectral band image data depicting one or more of the terrain features captured by the NIR spectral band images included in image data 300A, and at the same temporal resolution as the images of image data 300A. Thus, it is possible to process the NIR spectral band image data 300A and the red edge spectral band image data 300B (for example, as corresponding sets of time-series inputs) with a system, such as the one described with respect to FIG. 3, to generate inferred image data 309 that includes more red edge spectral band image data than was included in image data 300B and for more particular times during the particular time period the input images 300B were captured.

Although FIG. 3 depicts only two input sets of image data 300A-300B, it should be appreciated that the processes described with respect to FIG. 3 may be performed with any two or more input sets of image data each corresponding to any number of spectral bands by simply adding additional transformers. It should also be appreciated that, in some implementations, the input image data 300A, input image data 300B, and/or one or more additional sets of input image data (not depicted) may correspond to a different level of spatial resolution than one or more of the other sets of input image data. In such implementations, the transformers and/or multilayer perceptrons used may be trained based on various spectral bands, temporal resolutions, and spatial resolutions such that the generated embeddings described herein include semantic, descriptive, and representative information determined based on spectral information, temporal information, and spatial information (and/or mathematical relationships between the three types of information). Moreover, in some such implementations, one or more of the sets of input image data that differ in spatial resolution may first be upsampled or downsampled to a spatial resolution shared with the other input sets of image data before being applied to a corresponding transformer. In these implementations, the upsampled/downsampled image data may be treated much the same way upsampled image data 201E is in FIG. 2, and the output inferred image data 309 may include image data of spectral bands associated with multiple sets of the input image data.

FIG. 4 illustrates a flowchart of an example method for practicing selected aspects of the present disclosure. For convenience, the operations of the flowchart are described with reference to a system that performs the operations. This system may include various components of various computer systems, such as one or more components of the client device(s) 106, the terrain knowledge system 104, and/or the AG client(s) 107. Moreover, while operations of method 400 are shown in a particular order, this is not meant to be limiting. One or more operations may be reordered, omitted, or added.

At block 402, the system obtains image data capturing a particular geographic area during a particular time period, the image data including at least: (1) first image data captured in a first spectral band at a first resolution and depicting one or more terrain features of the particular geographic area; and (2) second image data captured in a second spectral band at a second resolution that is lower than the first resolution. The second image data may or may not include sufficient detail and/or spatial resolution for terrain features to be considered "captured by" the second image data (e.g., insufficient to perform object recognition), however, the second image data will still include visual attributes of the particular geographic area that may be useful for determining terrain features.

At block 404, the system applies the first image data as input to a first upstream machine learning model trained to generate spectral band embeddings that include at least semantic information representing the visual attributes captured in corresponding input high-elevation image data. For example, in some implementations, the first upstream machine learning model may comprise a transformer machine learning model or a network of multiple transformer machine learning models, as described herein. Thus, the first image data is applied as input to the first upstream machine learning model in order to receive, as output, one or more first spectral band embeddings that semantically represent the visual attributes (e.g., terrain features) of the particular geographic area that were captured in the first spectral band by the first image data. Further, in some implementations, the first spectral band embeddings are generated to include additional information beyond the semantic information. For example, the corresponding first spectral band embeddings may be generated to include indications of determined mathematical relationships describing the representation of the visual attributes in the first image data.

Likewise, at block 406, the system applies the second image data as input to a second upstream machine learning model also trained to generate spectral band embeddings that include at least semantic information representing the visual attributes captured in corresponding input high-elevation image data. The second upstream machine learning model may comprise, for example, a transformer machine learning model or a network of transformer machine learning models, as described herein. Thus, the second upstream transformer network takes the input second image data in order to generate, as output, one or more second spectral band embeddings that semantically represent the visual attributes (e.g., terrain features, or more nebulous spectral-spatial attributes) of the particular geographic area that were captured in the second spectral band by the second image data. Further, in some implementations, the second spectral band embeddings are generated to include additional information beyond the semantic information. For example, the corresponding second spectral band embeddings may be generated to include indications of determined mathematical relationships describing the representation of the visual attributes in the second image data.

At block 408, the system infers second spectral band information about the one or more terrain features of the particular geographic area that were captured in the first image data. Block 408 includes two sub-block operations that are performed in order to accomplish this, sub-blocks 408A and 408B. At sub-block 408A, the system applies the one or more first spectral band embeddings and the one or more second spectral band embeddings to a downstream transformer machine learning model trained to process input spectral band embeddings in order to generate output including one or more inferred embeddings that semantically describe the spectral and spatial relationships between the visual attribute information indicated by both the first and second spectral band embeddings. At sub-block 408B, the system generates inferred image data based on the one or more inferred embedding(s), the inferred image data including synthetic super-resolution high elevation image data capturing the one or more terrain features in the second spectral band and at the first spatial resolution.

FIG. 5 illustrates a flowchart of an example method for practicing selected aspects of the present disclosure. For convenience, the operations of the flowchart are described with reference to a system that performs the operations. This system may include various components of various computer systems, such as one or more components of the client device(s) 106, the terrain knowledge system 104, and/or the AG client(s) 107. Moreover, while operations of method 400 are shown in a particular order, this is not meant to be limiting. One or more operations may be reordered, omitted, or added.

At block 502, the system the system obtains image data capturing a particular geographic area during a given time period, the image data including at least: (1) first image data depicting one or more terrain features of the particular geographic area and captured in a first spectral band at one or more first particular points in time during the given time period; and (2) second image data of the particular geographic area captured in a second spectral band at one or more second particular points in time during the given time period that are different than the one or more first particular points in time. The second image data may or may not include sufficient detail and/or spatial resolution for terrain features to be considered "captured by" the second image data (e.g., insufficient to perform object recognition), however, the second image data will still include visual attributes of the particular geographic area that may be useful for determining terrain features.

At block 504, the system applies the first image data as input to a first upstream machine learning model trained to generate spectral band embeddings that semantically represent the visual attributes captured in corresponding input high-elevation image data which, for example, may comprise a first upstream transformer machine learning model and/or a first upstream network of transformer machine learning models, as described herein. Thus, the first upstream machine learning model receives the input first image data and generates, as output, one or more first spectral band embeddings that include semantic information representing the visual attributes (e.g., terrain features) of the particular geographic area that were captured in the first spectral band at the one or more first particular points in time by the first image data.

At block 506, the system applies the second image data as input to a second upstream machine learning model trained to generate spectral band embeddings that semantically represent the visual attributes captured in corresponding input high-elevation image data which, for example, may comprise a second upstream transformer machine learning model and/or a second upstream network of transformer machine learning models, as described herein. Thus, the second upstream machine learning model receives the input second image data and generates, as output, one or more second spectral band embeddings that include semantic information representing the visual attributes of the particular geographic area that were captured in the second spectral band at the one or more second particular points in time by the second image data.

At block 508, the system infers second spectral band information about the one or more terrain features of the particular geographic area that were captured in the first image data. Block 508 includes two sub-block operations that are performed in order to accomplish this, sub-blocks 508A and 508B. At sub-block 508A, the system applies the one or more first spectral band embeddings and the one or more second spectral band embeddings to a downstream machine learning model trained to process input spectral band embeddings in order to generate output inferred embeddings that semantically describe the spectral and spatial relationships between the visual attribute information indicated by both the first and second spectral band embeddings. This downstream machine learning model may comprise, for example, a downstream transformer machine learning model and/or a downstream network of transformer machine learning models, as described herein. At sub-block 408B, the system generates inferred image data based on the inferred embedding(s), the inferred image data including synthetic high elevation image data capturing the one or more terrain features in the second spectral band and at the one or more second particular points in time during the given time period.

Figure 6:
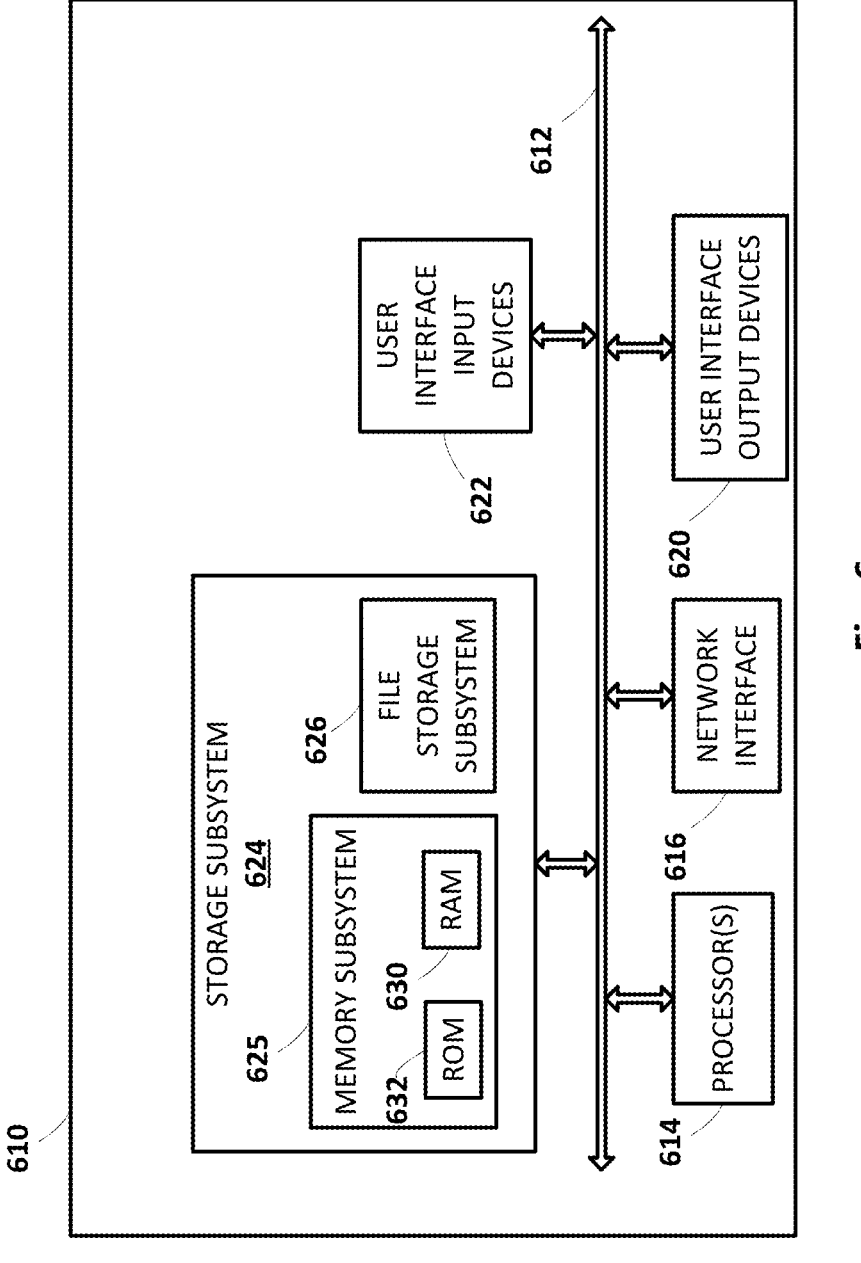
FIG. 6 is a block diagram of an example computing device that may optionally be utilized to perform one or more aspects of techniques described herein.

FIG. 6 is a block diagram of an example computing device 610 that may optionally be utilized to perform one or more aspects of techniques described herein. Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In some implementations in which computing device 610 takes the form of a HMD or smart glasses, a pose of a user's eyes may be tracked for use, e.g., alone or in combination with other stimuli (e.g., blinking, pressing a button, etc.), as user input. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, one or more displays forming part of a HMD, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method 400 described herein, as well as to implement various components depicted in FIGS. 1-3.

These software modules are generally executed by processor 614 alone or in combination with other processors. Memory subsystem 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 615.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method comprising:

obtaining image data capturing a particular geographic area during a particular time period, the image data including at least:

first image data captured in a first spectral band at a first spatial resolution, wherein the first image data depicts one or more terrain features of the particular geographic area, and second image data captured in a second spectral band at a second spatial resolution less than the first spatial resolution;

applying, as input to a first upstream machine learning model, the first image data to generate, as output, one or more first spectral band embeddings, wherein the one or more first spectral band embeddings semantically represent the one or more terrain features of the particular geographic area;

applying, as input to a second upstream machine learning model, the second image data to generate, as output, one or more second spectral band embeddings; and inferring second spectral band information about the one or more terrain features of the particular geographic area, wherein the inferring includes:

applying, as inputs to a downstream machine learning model, the one or more first spectral band embeddings and the one or more second spectral band embeddings to generate, as output, one or more inferred embeddings, wherein the one or more inferred embeddings indicate at least semantic information that corresponds to both the first spectral band and the second spectral band; and generating, based on the one or more inferred embeddings, inferred image data, the inferred image data including image data in the second spectral band that captures the one or more terrain features at the first spatial resolution.

2. The method of claim 1, wherein the first image data and the second image data comprise high-elevation imagery captured by one or more satellites at separate times.

3. The method of claim 1, wherein the first image data and the second image data include corresponding temporal data including:

first temporal data associated with the first image data captured in the first spectral band at the first spatial resolution, wherein the first temporal data indicates one or more first particular times, during the particular time period, at which the first image data was captured, and second temporal data associated with the second image data captured in the second spectral band at the second spatial resolution, wherein the second temporal data indicates one or more second particular times, during the particular time period, at which the second image data was captured, wherein the one or more first particular times and the one or more second particular times occur at different times, and wherein the one or more first spectral band embeddings and the one or more second spectral band embeddings include corresponding spatial and temporal information.

4. The method of claim 3, wherein the generated inferred image data in the second spectral band that captures the one or more terrain features of the particular geographic area at the first spatial resolution captures the one or more terrain features of the particular geographic area at the one or more first particular times.

5. The method of claim 3, wherein applying the first image data as input to the first upstream machine learning model and applying the second image data as input to the second upstream machine learning model includes applying the first image data and the second image data as corresponding time-series image data.

6. The method of claim 1, wherein the inferred image data is generated further based on upsampling the second image data to the first spatial resolution.

7. The method of claim 1, wherein the downstream machine learning model comprises a transformer machine learning model.

8. The method of claim 1, wherein applying the second image data as input to the second upstream machine learning model includes upsampling the second image data to the first spatial resolution and applying the upsampled second image data as input to the second upstream machine learning model.

9. A system, comprising:

one or more processors; and one or more memory storage devices storing instructions that, when executed by the one or more processors, cause the one or more processors to perform operations comprising:

obtaining image data capturing a particular geographic area during a particular time period, the image data including at least:

first image data captured in a first spectral band at a first spatial resolution, wherein the first image data depicts one or more terrain features of the particular geographic area, and second image data captured in a second spectral band at a second spatial resolution less than the first spatial resolution;

applying, as input to a first upstream machine learning model, the first image data to generate, as output, one or more first spectral band embeddings, wherein the one or more first spectral band embeddings semantically represent the one or more terrain features of the particular geographic area;

applying, as input to a second upstream machine learning model, the second image data to generate, as output, one or more second spectral band embeddings; and inferring second spectral band information about the one or more terrain features of the particular geographic area, wherein the inferring includes:

applying, as inputs to a downstream machine learning model, the one or more first spectral band embeddings and the one or more second spectral band embeddings to generate, as output, one or more inferred embeddings, wherein the one or more inferred embeddings indicate at least semantic information that corresponds to both the first spectral band and the second spectral band; and generating, based on the one or more inferred embeddings, inferred image data, the inferred image data including image data in the second spectral band that captures the one or more terrain features at the first spatial resolution.

10. The system of claim 9, wherein the first image data and the second image data comprise high-elevation imagery captured by one or more satellites at separate times.

11. The system of claim 9, wherein the first image data and the second image data include corresponding temporal data including:

first temporal data associated with the first image data captured in the first spectral band at the first spatial resolution, wherein the first temporal data indicates one or more first particular times, during the particular time period, at which the first image data was captured, and second temporal data associated with the second image data captured in the second spectral band at the second spatial resolution, wherein the second temporal data indicates one or more second particular times, during the particular time period, at which the second image data was captured, wherein the one or more first particular times and the one or more second particular times occur at different times, and wherein the one or more first spectral band embeddings and the one or more second spectral band embeddings include corresponding spatial and temporal information.

12. The system of claim 11, wherein the generated inferred image data in the second spectral band that captures the one or more terrain features of the particular geographic area at the first spatial resolution captures the one or more terrain features of the particular geographic area at the one or more first particular times.

13. The system of claim 11, wherein applying the first image data as input to the first upstream machine learning model and applying the second image data as input to the second upstream machine learning model includes applying the first image data and the second image data as corresponding time-series image data.

14. The system of claim 9, wherein the downstream machine learning model comprises a transformer machine learning model.

15. The system of claim 9, wherein applying the second image data as input to the second upstream machine learning model includes upsampling the second image data to the first spatial resolution and applying the upsampled second image data as input to the second upstream machine learning model.

16. One or more non-transitory computer-readable storage mediums storing instructions that, when executed by one or more processors, cause the one or more processors to perform operations comprising:

obtaining image data capturing a particular geographic area during a particular time period, the image data including at least:

first image data captured in a first spectral band at a first spatial resolution, wherein the first image data depicts one or more terrain features of the particular geographic area, and second image data captured in a second spectral band at a second spatial resolution less than the first spatial resolution;

applying, as input to a first upstream machine learning model, the first image data to generate, as output, one or more first spectral band embeddings, wherein the one or more first spectral band embeddings semantically represent the one or more terrain features of the particular geographic area;

applying, as input to a second upstream machine learning model, the second image data to generate, as output, one or more second spectral band embeddings; and inferring second spectral band information about the one or more terrain features of the particular geographic area, wherein the inferring includes:

applying, as inputs to a downstream machine learning model, the one or more first spectral band embeddings and the one or more second spectral band embeddings to generate, as output, one or more inferred embeddings, wherein the one or more inferred embeddings indicate at least semantic information that corresponds to both the first spectral band and the second spectral band; and generating, based on the one or more inferred embeddings, inferred image data, the inferred image data including image data in the second spectral band that captures the one or more terrain features at the first spatial resolution.

17. The one or more non-transitory computer-readable storage mediums of claim 16, wherein the first image data and the second image data comprise high-elevation imagery captured by one or more satellites at separate times.

18. The one or more non-transitory computer-readable storage mediums of claim 16, wherein the first image data and the second image data include corresponding temporal data including:

first temporal data associated with the first image data captured in the first spectral band at the first spatial resolution, wherein the first temporal data indicates one or more first particular times, during the particular time period, at which the first image data was captured, and second temporal data associated with the second image data captured in the second spectral band at the second spatial resolution, wherein the second temporal data indicates one or more second particular times, during the particular time period, at which the second image data was captured, wherein the one or more first particular times and the one or more second particular times occur at different times, and wherein the one or more first spectral band embeddings and the one or more second spectral band embeddings include corresponding spatial and temporal information.

19. The one or more non-transitory computer-readable storage mediums of claim 18, wherein the generated inferred image data in the second spectral band that captures the one or more terrain features of the particular geographic area at the first spatial resolution captures the one or more terrain features of the particular geographic area at the one or more first particular times.

20. The one or more non-transitory computer-readable storage mediums of claim 18, wherein applying the first image data as input to the first upstream machine learning model and applying the second image data as input to the second upstream machine learning model includes applying the first image data and the second image data as corresponding time-series image data.

* * * * *